(12) United States Patent
    Brock

(10) Patent No.: US 9,796,431 B1
(45) Date of Patent: Oct. 24, 2017

(54) AERODYNAMIC TRAILER

(71) Applicant: Aerovault, LLC, Henderson, NV (US)

(72) Inventor: Peter Elbert Brock, Henderson, NV (US)

( * ) Notice: Subject to any disclaimer, the term of this patent is extended or adjusted under 35 U.S.C. 154(b) by 0 days.

(21) Appl. No.: 15/001,032

(22) Filed: Jan. 19, 2016

(51) Int. Cl.
| | |
|---|---|
| *B62D 35/00* | (2006.01) |
| *B62D 35/02* | (2006.01) |
| *B62D 29/00* | (2006.01) |
| *B62D 29/04* | (2006.01) |

(52) U.S. Cl.
CPC ......... *B62D 35/001* (2013.01); *B62D 29/008* (2013.01); *B62D 29/043* (2013.01); *B62D 35/02* (2013.01)

(58) Field of Classification Search
CPC .... B62D 35/001; B62D 35/02; B62D 29/008; B62D 29/043
See application file for complete search history.

(56) References Cited

U.S. PATENT DOCUMENTS

| | | | | |
|---|---|---|---|---|
| 9,388,601 | B2* | 7/2016 | Reinking | ................ E04H 15/14 |
| 2006/0273622 | A1* | 12/2006 | Laird | ...................... B60P 3/105 |
| | | | | 296/168 |

* cited by examiner

*Primary Examiner* — Glenn Dayoan
*Assistant Examiner* — Melissa A Black
(74) *Attorney, Agent, or Firm* — FisherBroyles, LLP; Rob L. Phillips

(57) ABSTRACT

An aerodynamic trailer including first and second side panels, the side panels each having a trapezoidal channel running along a substantial length thereof; an arcuate front panel extending substantially between front edges of the side panels; a top positioned above the front panel and the side panels, the top having a rearwardly sloping front section and two oppositely positioned outer fins running along outward portions thereof and a center fin running along a center thereof; a door positioned at rear edges of the side panels and the top; and at least one axle supporting at least two wheels. Other features of the trailer create aerodynamic benefits.

21 Claims, 8 Drawing Sheets

AERODYNAMIC TRAILER

FIELD OF THE INVENTION

The embodiments of the present invention relate to an aerodynamic trailer designed to (i) eliminate a conventional interior trailer frame structure, (ii) improve over-road fuel efficiency by reducing aerodynamic drag and (iii) improve handling and safety by reducing the effects of crosswinds and turbulence created by ground effects and passing, or being passed by, other vehicles on the road.

BACKGROUND

Conventional trailers are constructed with an interior frame which provides the necessary support for the outer skin of the trailer. Moreover, such trailers are normally rectangular in shape to accommodate the desired load (e.g., automobiles) to be transported therein.

It would be advantageous, to develop a trailer with additional interior space by utilizing an exterior frame in lieu of a conventional interior frame. Beneficially, the trailer should be designed with aerodynamic features causing the trailer to ride smoother while resisting cross-winds for overall better handling of the trailer and vehicle pulling the same while improving fuel-efficiency for the vehicle pulling the same.

SUMMARY

Accordingly, one embodiment of the present invention is an aerodynamic trailer including first and second side panels each having aa longitudinal channel running along a substantial length thereof; an arcuate front panel extending substantially between front sections of said side panels; a top positioned above said front panel and said side panels, said top having a rearwardly sloping front section, two oppositely positioned outer fins running along outward portions thereof and a center fin running along a center thereof; a rear door positioned proximate to rear portions of said side panels and said top; and at least one axle supporting at least two wheels The channels running along said side panels create rigidity along the side panels while the arcuate front panel being formed of a single piece of curved metal has a natural curved rigidity such that the trailer is structurally strengthened without an interior frame structure. In one embodiment, the side panels are each fabricated of a single piece of aluminum with the channels being created using a press brake machine or similar machine.

The unique aerodynamic design of the trailer reduces aerodynamic drag and the structural "exoskeletal" fins help reduce effects of crosswinds. In another embodiment, the entire undersurface and wheel axles are covered to further reduce drag and turbulence created by air moving beneath the trailer.

Other variations, embodiments and features of the present invention will become evident from the following detailed description, drawings and claims.

DETAILED DESCRIPTION

Figure 1:
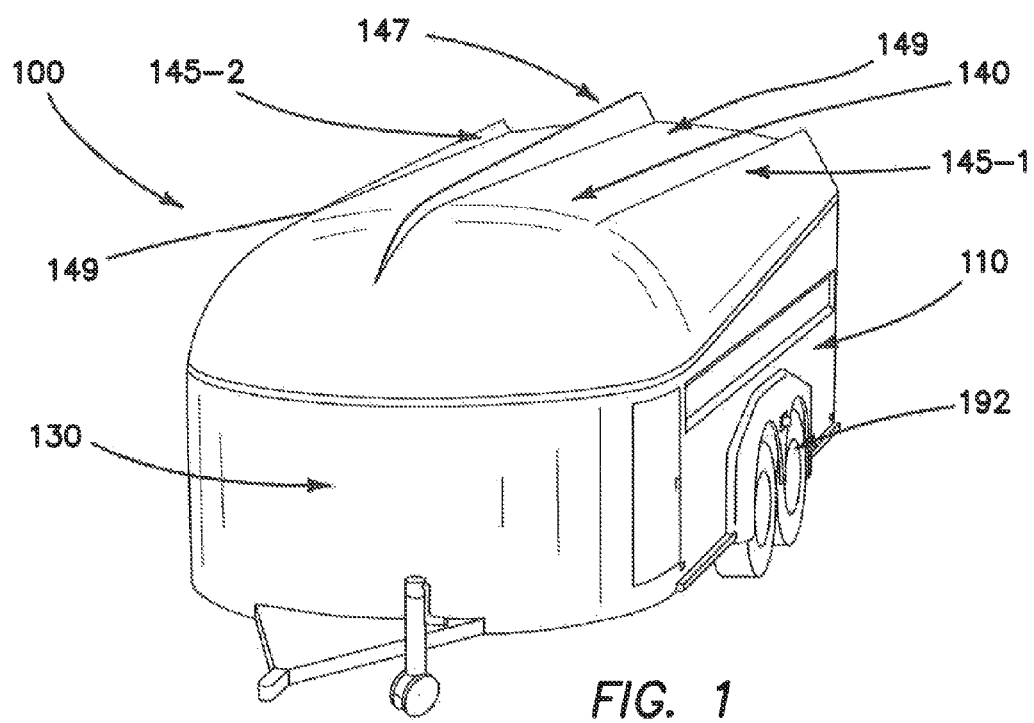
FIG. 1 illustrates an upper perspective front view of a trailer according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The components described herein may be fabricated of various materials including metals, alloys, composites, fiberglass, polymers and the like. The components may be fabricated using machining, stamping, molding, additive techniques and the like. In one embodiment, aluminum and fiberglass are used to fabricate a large majority of the trailer.

Figure 8:
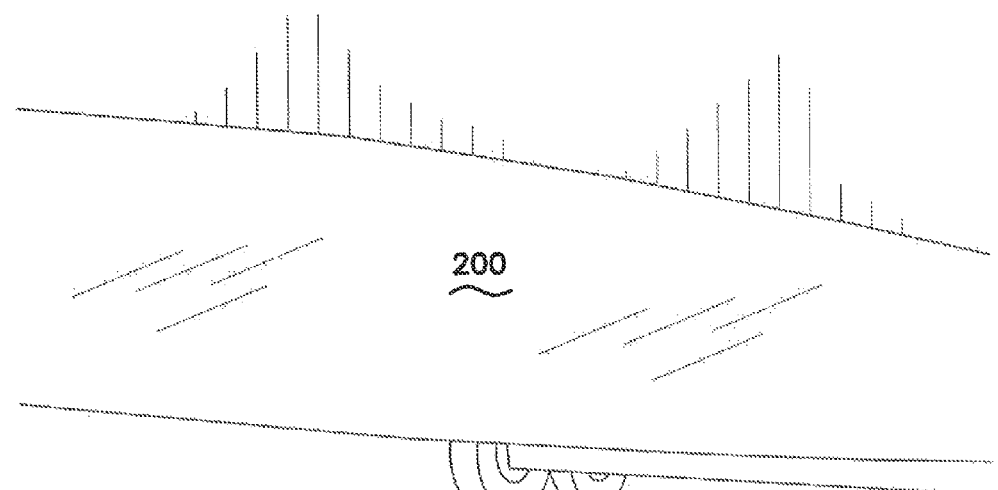
FIG. 8 illustrates a smoothly surfaced underside of the trailer according to the embodiments of the present invention.

Now referring to FIGS. 1 through 3B, the embodiments of the present invention relate to an aerodynamic trailer 100. The trailer 100 includes broadly a first side panel 110, second side panel 120, front panel 130, top 140, rear door 150, wheels 160-1 through 160-4 and main frame, the internal undercarriage 170. In one embodiment, each side panel 110, 120 is fabricated of a single piece of material (e.g., aluminum). As shown in FIG. 8, bends 115-1, 115-2, 125-1 and 125-2 are formed into each panel 110, 120, respectively, to provide structural rigidity along lengths thereof. The bends 115-1, 115-2, 125-1 and 125-2 form trapezoidal channels 116, 126, respectively. The trapezoidal channels 116, 126, resist flexing along horizontal axes of the side panels 110, 120 such that an interior frame is not necessary to support said side panels 110, 120.

Figure 4:
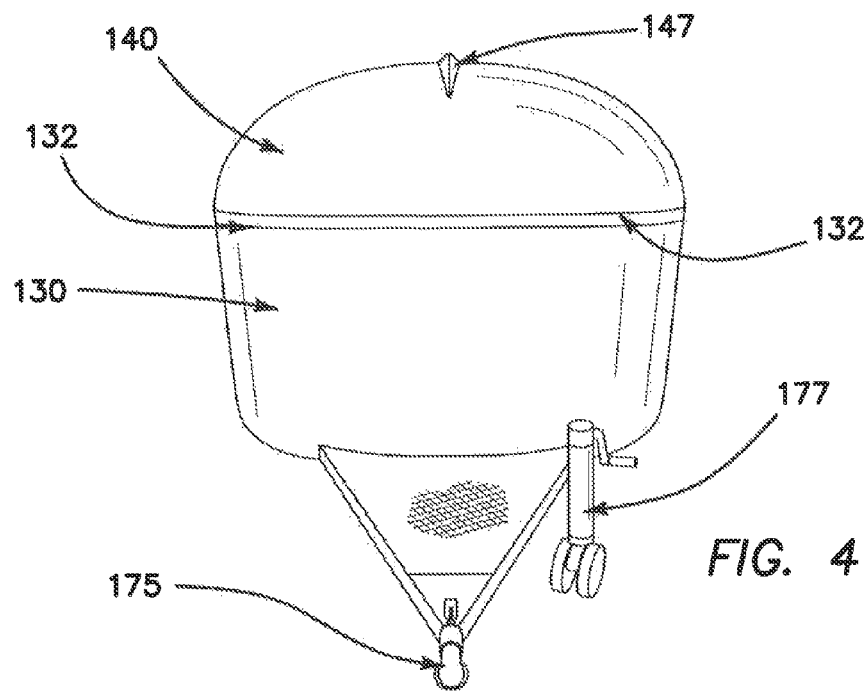
FIG. 4 illustrates a front view of the trailer according to the embodiments of the present invention.
Figure 11:
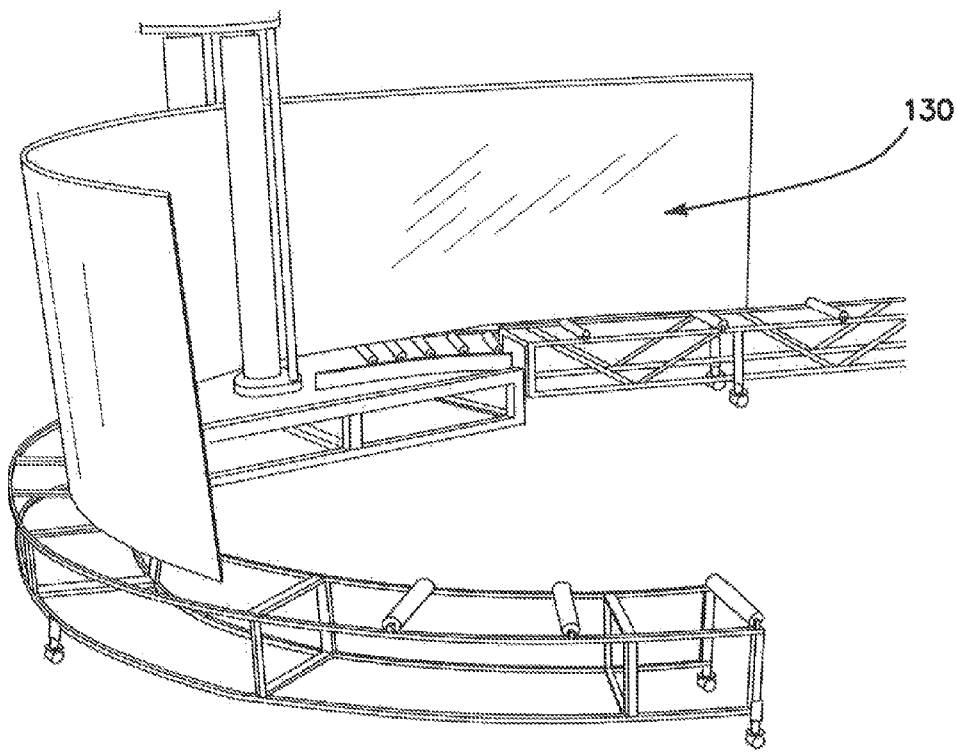
FIG. 11 illustrates a front panel being formed according to the embodiments of the present invention.

As shown best in FIG. 4, in one embodiment, the front panel 130 is a single piece of aluminum bent into an arcuate shape as shown in FIG. 11. The arcuate shape is a natural stable shape which resists flexing while further providing an aerodynamic front surface. While a vehicle towing the trailer 100 tends to block air flow from the front surface of the trailer 100, such is not always true. Accordingly, when air flow does reach the front surface of the trailer 100, the arcuate front panel 130 directs said air flow around the front surface with limited drag. A conventional trailer's flat front surface creates maximum drag and turbulence when said flat front surface encounters air flow.

The front panel 130 incorporates two doors 131, 132 providing access to a front, internal portion of the trailer 100. In one embodiment, the doors 131, 132 are formed by cutting out a section of the front panel 130 so a hinged arrangement may be used to re-attach the cutout sections to the front panel 130. Locking handles 136, 137 maintain the doors 131, 132 in closed positions and provide means for opening the same.

Figure 2:
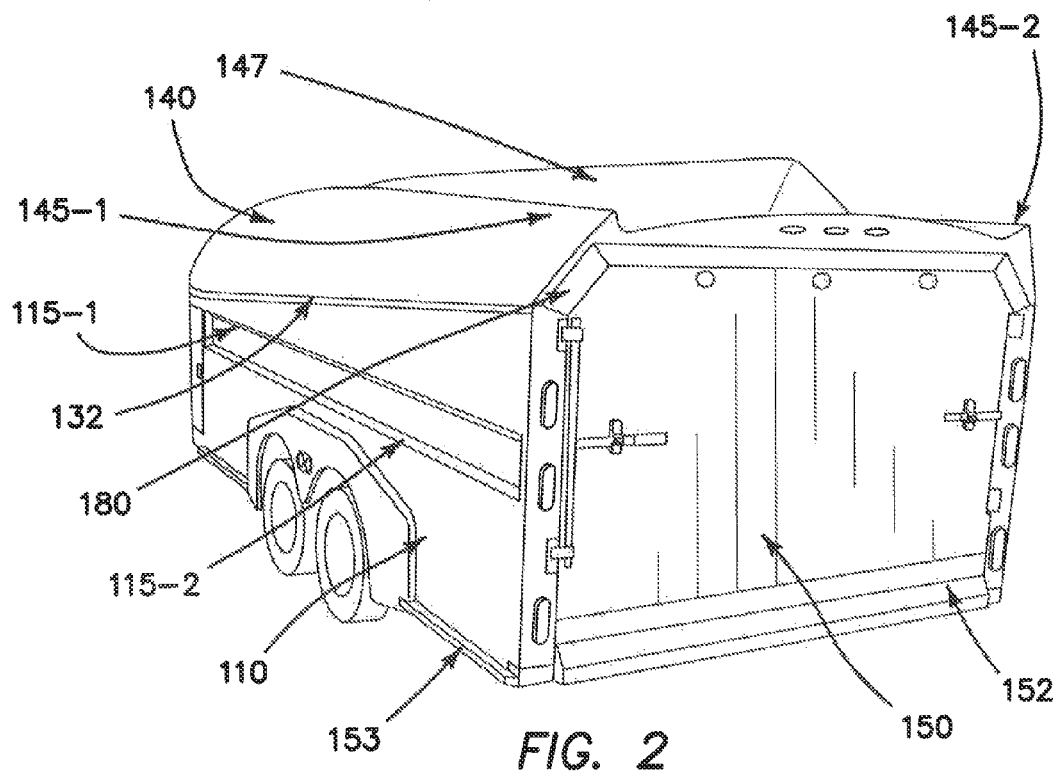
FIG. 2 illustrates a side and rear perspective view of the trailer according to the embodiments of the present invention.
Figure 3A:
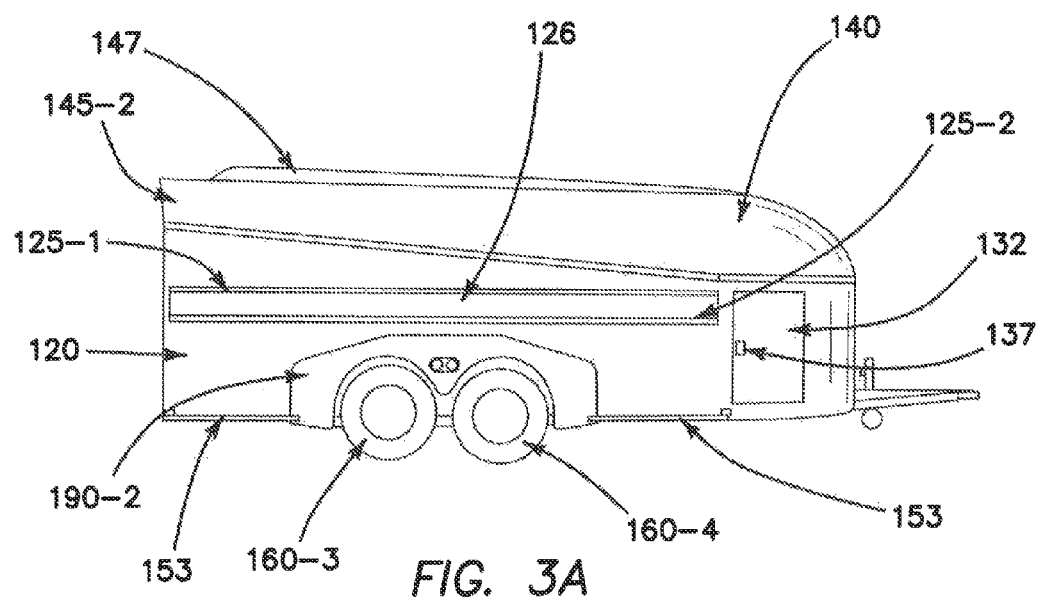
FIGS. 3A and 3B illustrate side views of the trailer according to the embodiments of the present invention.
Figure 3B:
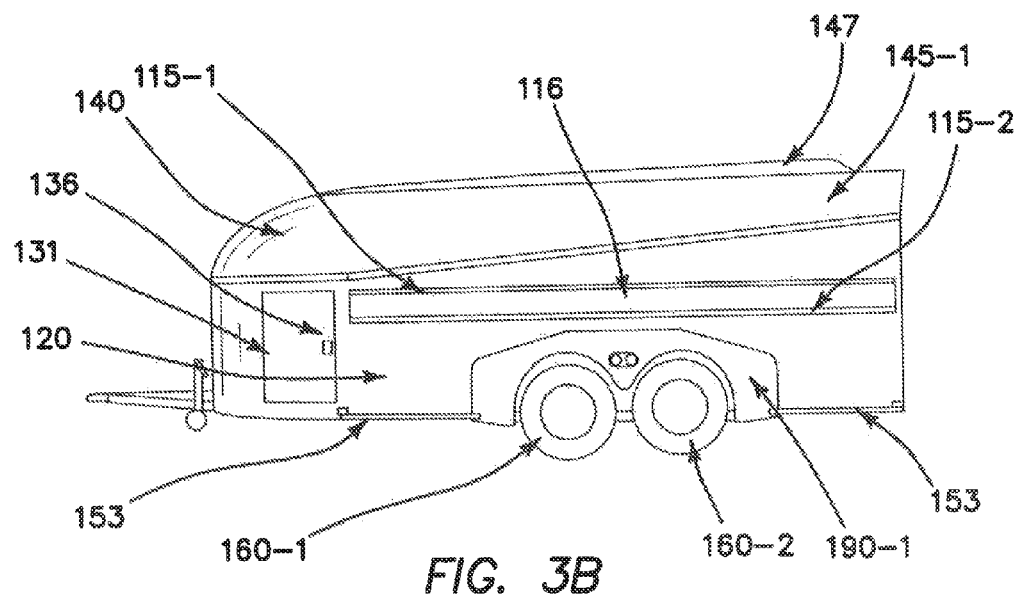
Figure 5:
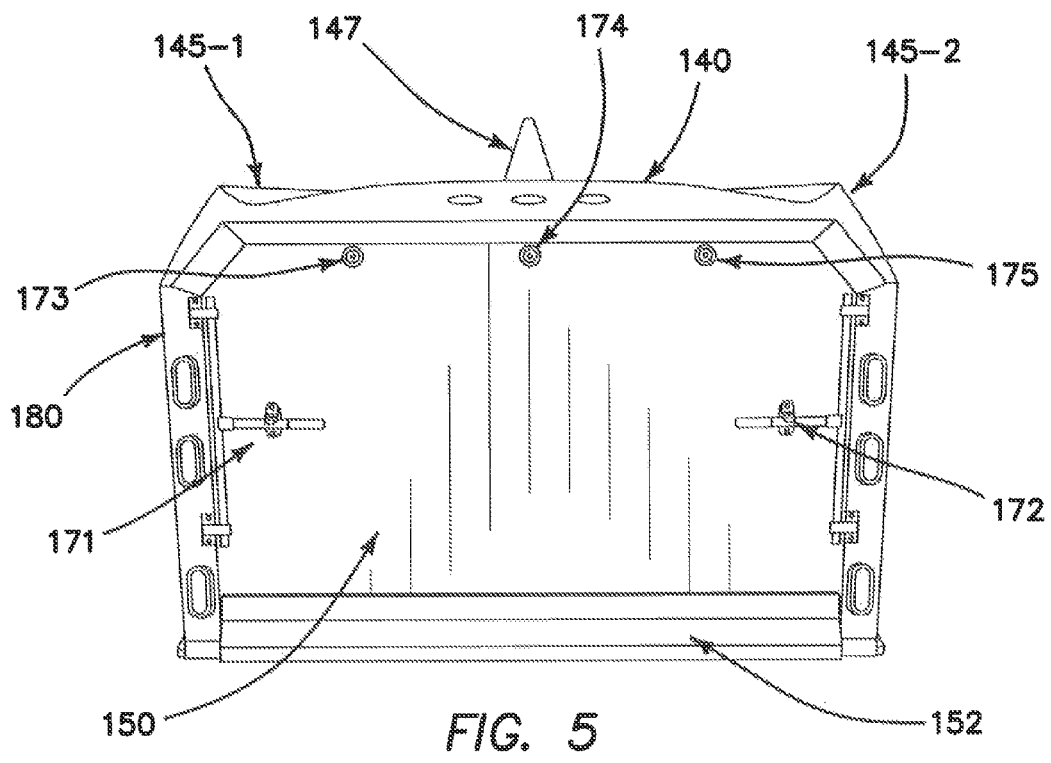
FIG. 5 illustrates a rear view of the trailer according to the embodiments of the present invention.
Figure 7:
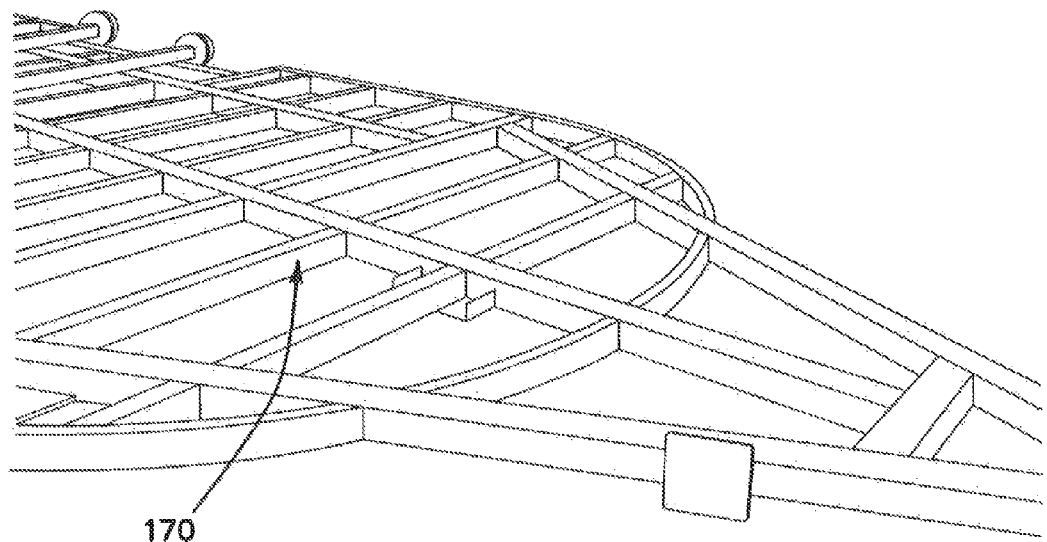
FIG. 7 illustrates a structural undercarriage frame according to the embodiments of the preset invention.

FIGS. 2, 5A and 5B show a rear, drop-down door or tailgate 150. The rear, drop-down door 150 permanently and rotatably attaches to the undercarriage 170 enabling the rear, drop-down door 150 to swing open in a downward direction. In one embodiment, a rod and spring arrangement provides resistance to the weight of the door for easily controlled rotation of the rear, drop-down door 150. A guard 152, or rear apron, protects the rod and spring arrangement. Other rotation systems (e.g., spring-biased hinges) may be used as well. A pair of handle locks 171, 172 provides a mechanism for opening and securing the rear, drop-down door 150 in a closed position. A plurality of bumpers 173-175 provides a buffer for resting the rear, drop-down door 150 against the ground when in an open position. The bumpers 173-175 also serve to prevent damage to the rear, drop-down door 150 when in the open position. A rear vertical frame member 180 attaches to the undercarriage 170 (best seen in FIG. 7) and frames the rear, drop-down door 150 and provides a structure for attachment of the pair of handle locks 171, 172. In an open position, the rear, drop-down door 150 acts as a ramp to load vehicles or other cargo to be transported within said trailer 100.

The undercarriage 170 is a sandwiched frame lattice which is configured to support the components of the trailer 100. The frame lattice extends forward to a trailer hitch 175. An adjustable height front wheel member 177 provides a mechanism for manually moving the trailer 100 and raising or lowering the front end of the trailer 100 onto a tow vehicle hitch.

Figure 12:
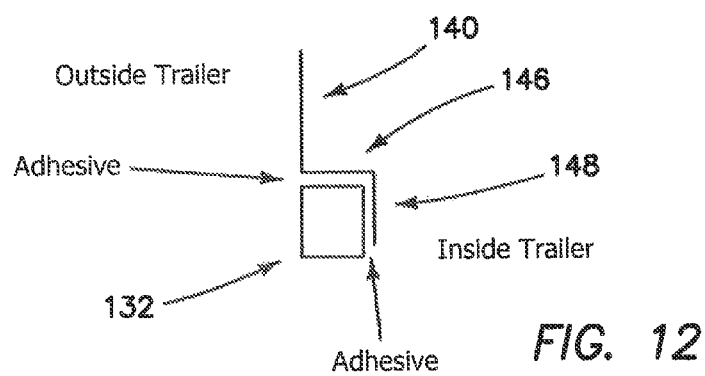
FIG. 12 illustrates a cross-sectional view of the roof/top connection to the trailer body according to the embodiments of the preset invention.

FIGS. 1-5 show the top 140 of the trailer 100 in position upon the vertical frame member 180, front panel 130 and side panels 110, 120. Attachment of the top 140 is accomplished using a combination of fasteners and adhesives (e.g., two part epoxy) for bonding aluminum to fiberglass. In one embodiment, the adhesive may be supplemented with fasteners such as rivets 131 or nut and bolt combinations which attach the top 140 to an upper frame member 132 circumscribing an upper edge of said side panels 110, 120 and front panel 130. The adhesive forms a secure bond and permits the two different materials to expand and contract at their own rates without impacting the other. In one embodiment, as shown in FIG. 12, the lower edge of the top 140 includes a flange comprising a horizontal section 146 and vertical section 148 which rests on the upper frame member 132 extending around the upper edge of the side panels 110, 120 and front panel 130. FIG. 12 shows the position of the adhesive. The upper frame member 132 connects to the rear vertical frame 180 proximate to the rear, drop-down door 150.

The front portion of the top 140 is arcuate sloping rearward to limit drag. As detailed above relative to the front panel 130, a vehicle towing the trailer 100 tends to block air flow from the front surface of the top 140, such is not always true (e.g., when a low profile automobile is towing the trailer). Accordingly, when air flow does reach the front surface of the trailer 100, the arcuate top 140 directs said air flow over the front surface with limited drag. A conventional trailer's flat front surface creates maximum drag when said flat front surface encounters air flow.

Figure 6A:
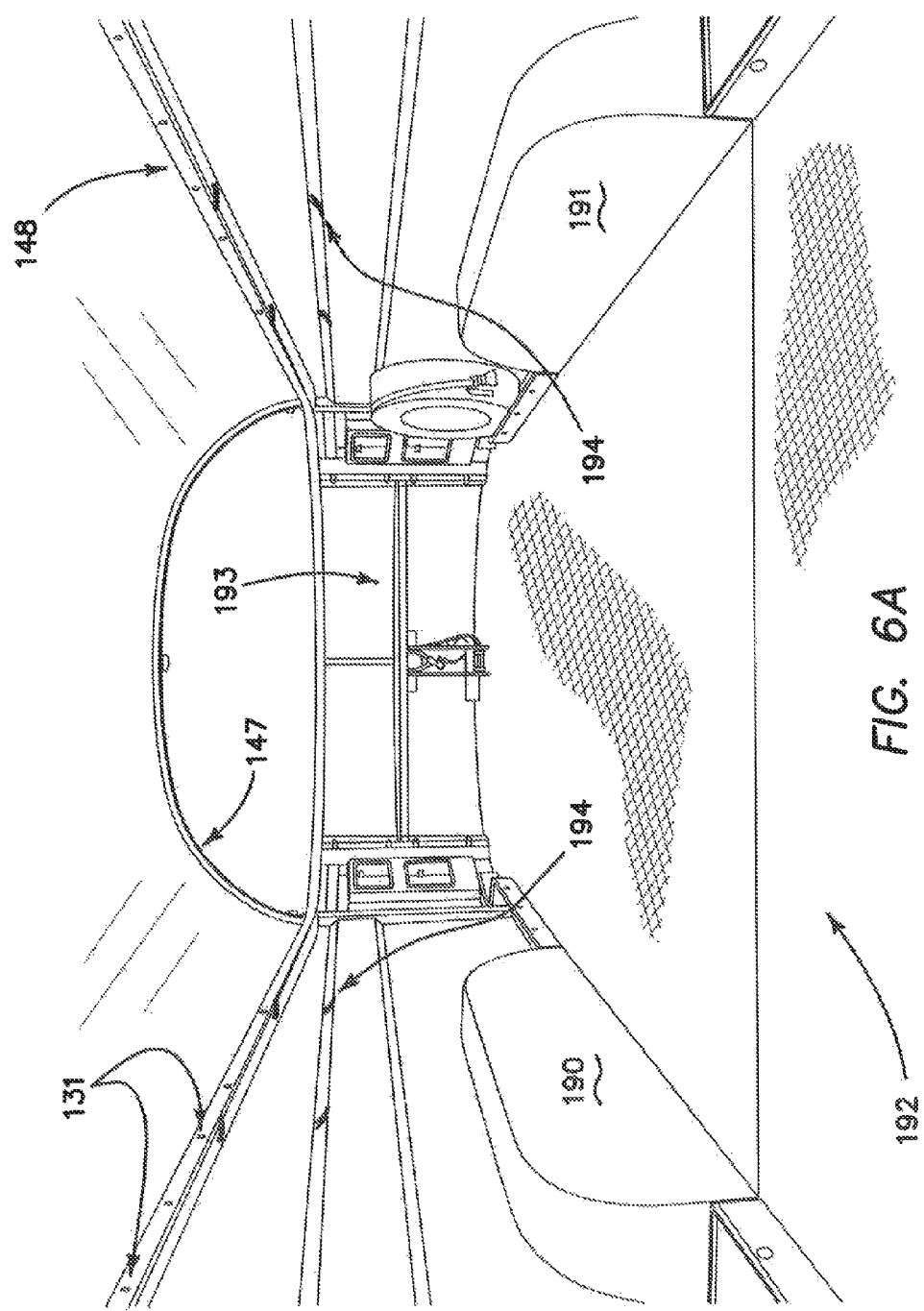
FIGS. 6A through 6C illustrate various interior views of the trailer according to the embodiments of the present invention.
Figure 6B:
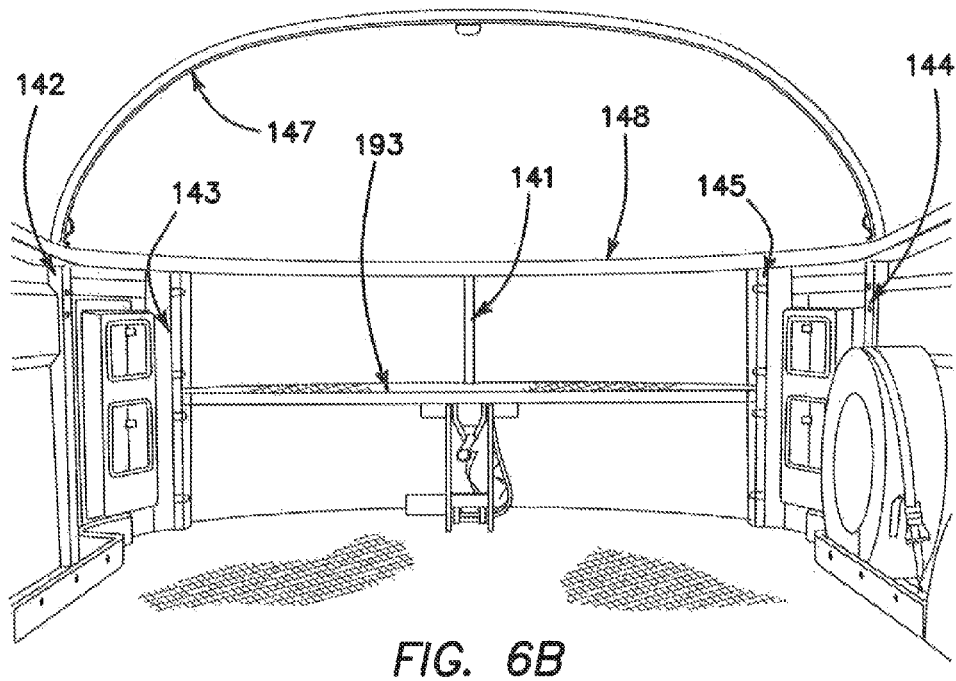
Figure 6C:
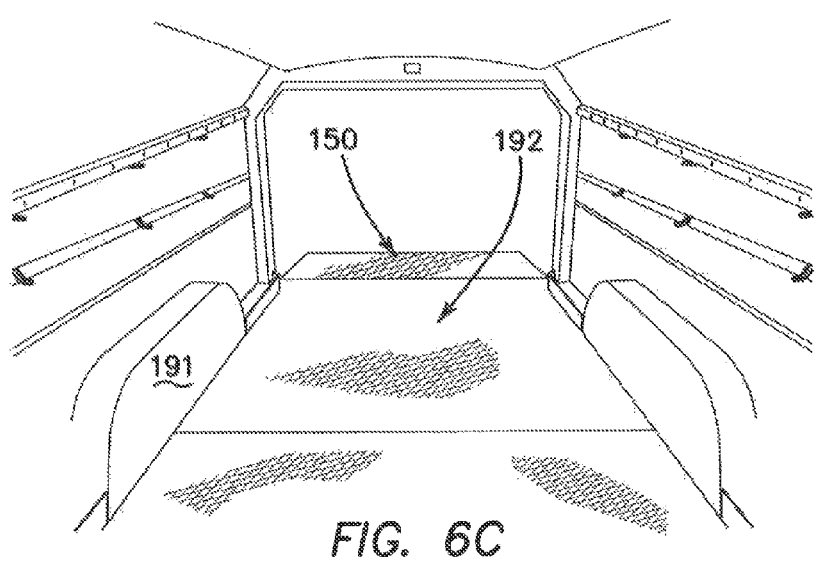

One or more spars 147, as best visible in FIGS. 6A and 6B, provide an inner shielded routing for electrical wiring and also providing additional support and stability for the top 140. Five struts 141-145 extending vertically between the undercarriage 170 and upper frame member 132 proximate to the front panel 130 serve to support the weight of the top 140 and/or maintain the arcuate shape of the front panel 130. More or less than five struts may be used. Other interior features of the trailer 100 comprise wheel covers (inner fenders) 190, 191, a floor 192 secured to the undercarriage 170 which is "sandwiched" to the frame 170 to increase structural rigidity, a shelf 193 and various tie-downs 194.

The top 140 also incorporates a pair of outer fins 145-1, 145-2 and a center fin 147. In one embodiment, the top 140, including triangular sectioned outer fins 145-1, 145-2 and center fin 147, is molded using fiberglass or similar composite material. Those skilled in the art will recognize that other fabrication techniques may be used to create the top 140. The outer fins 145-1, 145-2 and center fin 147 provide longitudinal structure to the top 140 and also provide stability to the trailer 100 when being towed. More specifically, the outer fins 145-1, 145-2 and center fin 147 maintain the trailer 100 moving in a forward direction and resist swaying caused by turbulent air including cross-winds. In one embodiment, the center fin 147 has a triangular cross-section. The center portion 149 of the top 140 has a slight arcuate shape which helps smooth air flow between the center fin 147 and two outer fins 145-1, 145-2 as well as increasing structural rigidity of the roof 140 top.

Two fiberglass wheel guards 190-1, 190-2 protect the wheels/tires and are further configured to permit smooth air flow around the wheels which tend to create turbulence when in motion. In one embodiment, like the top 140, the wheel guards (exterior fenders) 190-1, 190-2 are molded of fiberglass and may be adhered to the side panels 110, 120, respectively, using an adhesive. In another embodiment, conical wheel covers 192 further reduce turbulence caused by tires turning and disrupting air flow. FIG. 8 illustrates an underside of the trailer 100 including a substantially flat aluminum panel 200 connected to, and covering, the underside of the undercarriage 180 and wheel axles. Multiple flat members may be attached to the undercarriage 180 as well. Like other components of the trailer 100 described herein, the flat aluminum panel 200 reduces drag caused by air turbulence beneath the trailer 100 when in motion and increases the structural rigidity of the main frame 170. Nerf bars 153 running along bottom portions of the trailer 100 provide style and certain functionality (e.g., additional structural integrity) to the trailer 100.

Figure 9:
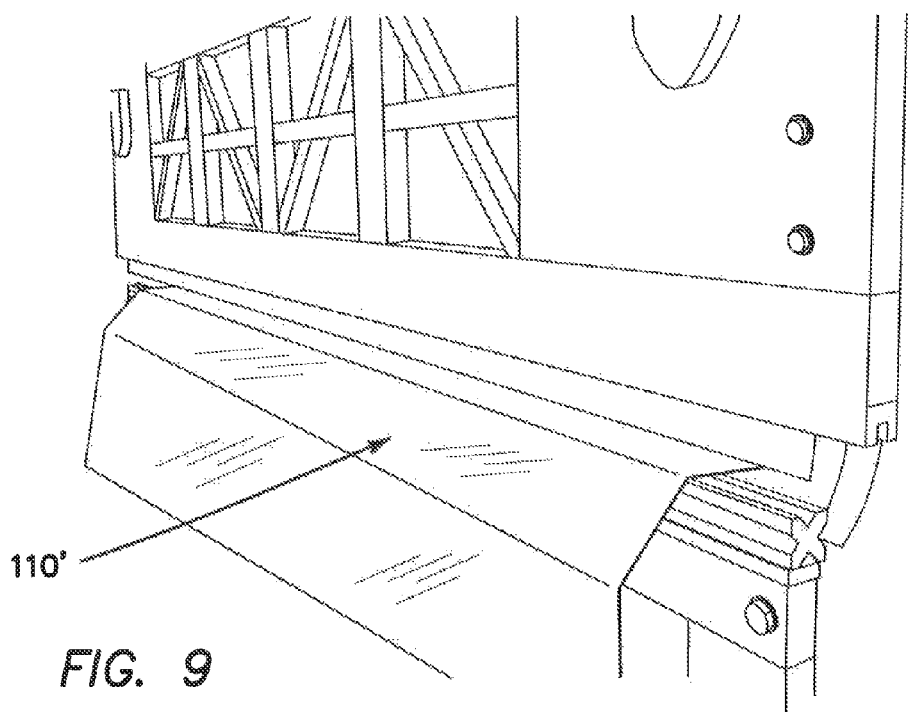
FIG. 9 illustrates a side panel being stamped with a structural channel according to the embodiments of the present invention.
Figure 10:
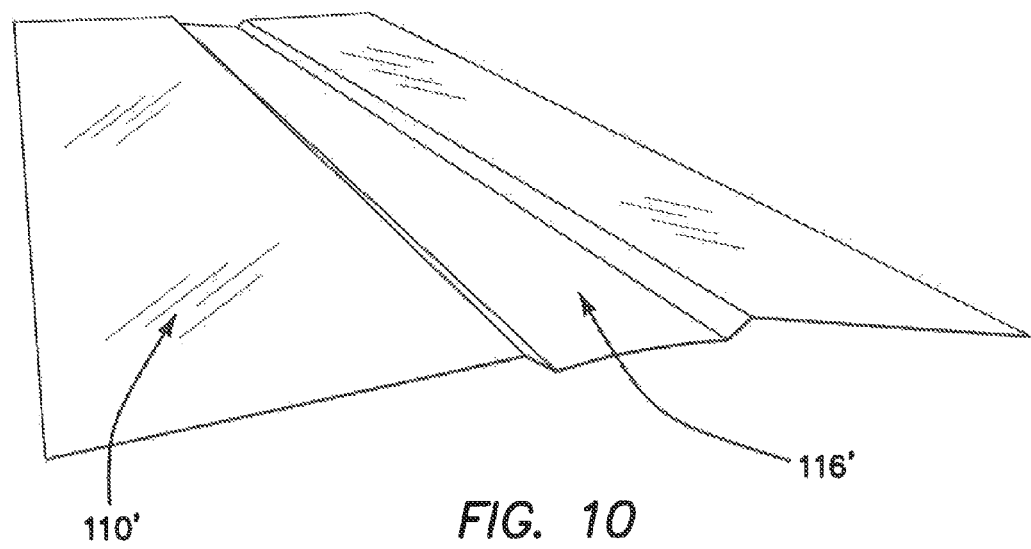
FIG. 10 illustrates a structural side panel according to the embodiments of the present invention.

FIG. 9 illustrates a side panel 110' undergoing a press brake stamping process to form the trapezoidal channel section according to the embodiments of the present invention and FIG. 10 illustrates a finished side panel 110' and channel 116' according to the embodiments of the present invention. FIG. 11 illustrates a front panel 130' undergoing a rolling process to create its arcuate shape according to the embodiments of the present invention.

Although the invention has been described in detail with reference to several embodiments, additional variations and modifications exist within the scope and spirit of the invention as described and defined in the following claims.

I claim:

1. An aerodynamic trailer comprising:
   first and second side panels each having a trapezoidal channel running along a substantial length thereof;
   an arcuate front panel extending rearward from a point forward and between spaced front edges of said first and second side panels;
   a top positioned above said front panel and said side panels, said top having a rearwardly sloping, smooth and arcuate front section, two oppositely positioned outer fins running along outward portions thereof and a center fin running along a center portion thereof, said fins extending upward from said top to provide structural integrity and prevent swaying of said trailer;
   a rear door positioned proximate to said rear portions of said side panels and said top; and
   at least one axle supporting at least two wheels.

2. The aerodynamic trailer of claim 1 further comprising a rear vertical frame member proximate to said rear door.

3. The aerodynamic trailer of claim 2 further comprising a top frame member circumscribing an upper portion of said side panels and front panel, said upper frame member connected to said vertical frame member.

4. The aerodynamic trailer of claim 1 further comprising one or more doors in said front panel, said one or more doors providing access to an interior of said trailer.

5. The aerodynamic trailer of claim 1 further comprising an undercarriage supporting said side panels, front panel, rear door and top.

6. The aerodynamic trailer of claim 1 wherein said top is molded or formed of fiberglass, other composite material or light alloy materials.

7. The aerodynamic trailer of claim 3 wherein said top is connected to said upper frame member.

8. The aerodynamic trailer of claim 1 wherein said center fin has a triangular cross-section.

9. An aerodynamic trailer comprising:
   first and second side panels each having a trapezoidal channel running along a substantial length thereof;
   an arcuate front panel extending rearward substantially between front portions of said side panels;
   a top positioned above said front panel and said side panels, said top having a rearwardly sloping, smooth and arcuate front section;
   multiple fins extending upward from said top to provide structural integrity and prevent swaying to prevent swaying of said trailer;
   a rear door positioned proximate to rear portions of said side panels and said top;
   at least one axle supporting at least two wheels; and
   an undercarriage supporting said first and second side panels, front panel and top.

10. The aerodynamic trailer of claim 9 further comprising a rear vertical frame member proximate to said rear door.

11. The aerodynamic trailer of claim 10 further comprising a top frame member circumscribing an upper portion of said side panels and front panel, said upper frame member connected to said vertical frame member.

12. The aerodynamic trailer of claim 9 further comprising one or more doors in said front panel, said one or more doors providing access to an interior of said trailer.

13. The aerodynamic trailer of claim 11 wherein said top is connected to said upper frame member.

14. An aerodynamic trailer comprising:
   first and second side panels;
   an arcuate front panel extending substantially between front edges of said side panels;
   a top positioned above said front panel and said side panels, said top having a rearwardly sloping, smooth and arcuate front section, two oppositely positioned outer fins running along outward portions thereof and a center fin running along a center thereof, said fins extending upward from said top to provide structural integrity and prevent swaying to prevent swaying of said trailer;
   a rear door positioned proximate to rear portions of said side panels and said top; and
   at least one axle supporting at least two wheels.

15. The aerodynamic trailer of claim 14 further comprising a rear vertical frame member proximate to said rear door.

16. The aerodynamic trailer of claim 15 further comprising a top frame member circumscribing an upper portion of said side panels and front panel, said upper frame member connected to said vertical frame member.

17. The aerodynamic trailer of claim 14 further comprising an undercarriage supporting said side panels, front panel, rear door and top.

18. The aerodynamic trailer of claim 14 wherein said top is connected to said upper frame member.

19. The aerodynamic trailer of claim 15 wherein said center fin has a triangular cross-section.

20. An aerodynamic trailer comprising:
   first and second side panels each having a trapezoidal channel running along a substantial length thereof;
   an arcuate front panel extending substantially between front edges of said side panels;
   a top positioned above said front panel and said side panels, said top having a rearwardly sloping, smooth and arcuate front section, two oppositely positioned outer fins running along outward portions thereof and a center fin running along a center thereof, said fins extending upward above said top to provide structural integrity and prevent swaying of said trailer;
   a rear door positioned proximate to rear portions of said side panels and said top;
   at least one axle supporting at least two wheels;
   an undercarriage supporting at least said side panels, front panels, rear door and top;
   an upper frame member circumscribing a top portion of said side panels and front panel, said upper frame member connected to a rear vertical frame member; and
   wherein said top is attached to said upper frame member.

21. The aerodynamic trailer of claim 20 wherein said center fin has a triangular cross-section.

* * * * *